Patented Mar. 22, 1949

2,465,122

UNITED STATES PATENT OFFICE 2,465,122

RESINOUS COPOLYMERS OF STYRENE AND 2,5,2',5' - TETRACHLORO -4,4'- DIVINYL-BI-PHENYL

Fritz Rosenthal, Crescent Park, Borough of Bellmawr, N. J., assignor to Radio Corporation of America, a corporation of Delaware No Drawing. Application November 30, 1945, Serial No. 632,084

5 Claims. (Cl. 260—74)

1

This invention relates to the preparation of new copolymer resins containing 2,5,2'5'-tetrahalogeno-4,-4'-divinyl-biphenyl. More specifically it relates to copolymers in which the cross-linking agent is the chlorine derivative and is used with polymers such as polystyrene.

Polymerization products of the type ($-CH_2-CHX-$)$_n$ are usually formed by a chain reaction of a monomer of the type $CH_2=CHX$ under conditions favoring polymerization. The resulting polymers are always thermoplastic in nature; i. e., they are characterized by a relatively low softening point. This softening point is taken as the temperature at which the material is readily distorted. The molecules of these polymers are understood to have the form of very long linear "chains." H. Staudinger and W. Heuer (Berichte, 67, 1159–1164, 1934) have discovered that a small addition of divinyl benzene to a monomer of the type $CH_2=CHX$ forms polymers of higher heat resistance than $CH_2=CHX$ alone, after having been subjected to conditions favoring polymerization. The addition agent copolymerizes with $CH_2=CHX$ in such a way that it forms connecting links or cross-links between individual chains of the formula ($-CH_2-CHX$)$_n$. Cross-linked high polymer chains are three-dimensional molecules which are characterized by higher heat resistance than unlinked, linear high polymer chains.

Staudinger and Heuer were not able to prepare divinyl-biphenyl nor, so far as the present inventor is aware, has anyone else been able to do so prior to his own invention, which is the subject of co-pending application of the present inventor, Serial No. 630,683, filed November 24, 1945. Cross-linked copolymers containing divinyl biphenyl are also the subject of another co-pending application of the present inventor, Serial No. 630,684, filed November 24, 1945, now Patent No. 2,462,555.

The present invention relates to the cross-linked copolymers containing 2,5,2'5'-tetrahalogeno-4,4'-divinyl-biphenyl. The preparation of the halogenated divinyl biphenyl, itself, is the subject of another co-pending application of the present inventor, Serial No. 632,083, filed November 30, 1945.

It is an object of the present invention to provide new, resinous copolymers containing 2,5,2'5'-tetrahalogeno-4,4'-divinyl-biphenyl as a cross-linking agent.

It is a further object to provide new, resinous copolymers containing 2,5,2'5'-tetrahalogeno-4,4'-divinyl-biphenyl and long chain molecules of the type exemplified by polystyrene.

A further object is to provide a method of copolymerizing 2,5,2'5'-tetrahalogeno-4,4'-divinyl-biphenyl with monomers of the styrene type.

In general, the method may be applied to monomers such as styrene by adding to styrene preferably 1 to 3 percent of its weight of 2,5,2'5'-tetrahalogeno-4,4'-divinyl-biphenyl and exposing the mixture to heat until polymerization is complete.

Example

A preferred example is to mix 2 percent by weight of 2,5,2'5' - tetrachloro - 4,4'-divinyl-biphenyl compared to weight of styrene and heat the divinyl compound and styrene together at 80° C. for four days in the presence of 1 percent by weight of the total mixture of benzoyl peroxide. The latter substance acts as a polymerization catalyst.

Although copolymers having percentages of 2,5,2'5'-tetrachloro-4,4'-divinyl-biphenyl higher than those showing in the example have increasing rigidity, higher amounts of the cross-linking agent may be used if products having higher rigidity are desired. The invention, therefore, is not limited to use of the lower percentages of cross-linking agent.

Polymerization catalysts other than benzoyl peroxide may be used and, in general, any catalyst useful in polymerizing styrene, itself, may be used. It is also possible to effect the copolymerization without the aid of any catalyst but a longer time is then needed to complete the reaction.

Although the invention has been illustrated in connection with styrene it is possible to form copolymers with others of a similar nature having unsaturated linkages in their monomeric form.

The polystyrene copolymers have improved heat resistance compared to polystyrene alone. The heat distortion point, measured in the conventional way, (see A. S. T. M. No. D648–41P, Tentative Method of Test for Distortion Under Heat of Molded Electrical Insulation Materials) is 105° C. for the copolymer containing 2 percent of the cross-linking agent while for polystyrene without the cross-linking agent it is 94° C. The copolymers of styrene obtained by this process will withstand, even for many hours, a temperature of 200° C. without deformation when no load is applied while unmodified polystyrene changes to a viscous liquid under the same conditions. Since the power factor of the copolymer is at least as low as that of polystyrene the new resins make excellent dielectrics in transformers carrying a high power load and are also equally useful as electrical insulators for wire, capacitors, resistors, etc.

In addition to being useful as improved dielectrics the new copolymers are also applicable as coating agents in general for glass, metal, wood, cloth, and paper. They are also compatible with other synthetic resins such as the coumarone-indene resins, polyisobutylene and other resins with which polystyrene is compatible.

I claim as my invention:

1. A resinous copolymer consisting essentially of styrene and an amount of 2,5,2'5'-tetrachloro-4,4'-divinyl-biphenyl equal to from 1 to 3 percent of the weight of the styrene.

2. A resinous copolymer consisting essentially of styrene and an amount of 2,5,2'5'-tetrachloro-4,4'-divinyl-biphenyl equal to two percent of the weight of the styrene.

3. A method of forming a resinous cross-linked copolymer comprising incorporating with styrene monomer an amount of 2,5,2'5'-tetrachloro-4,4'-divinyl-biphenyl equal to from one to three percent of the weight of the styrene and heating until polymerization is complete.

4. A method according to claim 3 in which there is utilized a minor amount of a polymerization catalyst.

5. A method according to claim 3 in which there is utilized a minor amount of benzoyl peroxide as a polymerization catalyst.

FRITZ ROSENTHAL.

No references cited.